United States Patent Office 3,434,485
Patented Mar. 25, 1969

3,434,485
TRANSPORTATION OF VISCOUS LIQUIDS
James L. Lummus, Tulsa, Okla., assignor to Pan American Petroleum Corporation, Tulsa, Okla., a corporation of Delaware
No Drawing. Continuation-in-part of application Ser. No. 343,466, Feb. 10, 1964. This application Sept. 30, 1965, Ser. No. 491,900
Int. Cl. F17d 1/16
U.S. Cl. 137—13      3 Claims

ABSTRACT OF THE DISCLOSURE

A viscous liquid is transported through a conduit. Flow is facilitated by introducing as a film at the internal surface of the conduit a less viscous liquid. The introduced filming liquid has elastic properties under conditions of use, so a force perpendicular to the direction of shear is developed in the film. This reduces inequalities in film thickness and reduces dispersion of the film into the main body of transported liquid.

This application is a continuation-in-part of my copending U.S. patent application S.N. 343,466 entitled Transportation of Viscous Liquids and filed February 10, 1964, now abandoned.

This invention relates to the transportation of viscous liquids in conduits. More particularly, it relates to the use of a film of less viscous liquid on the inner surface of the conduit to decrease the resistance to flow.

Many efforts have been made over the past twenty or thirty years to use films of water in pipe lines to decrease the power necessary to pump viscous liquids through the pipe lines. For example, some work along this line is reported in the Canadian Journal of Chemical Engineering for February 1961, starting on page 27. The references listed on page 36 of this article report other work. Two difficulties have prevented successful use of the technique. First, turbulence and shear at the interface between the viscous liquid and the less viscous film causes waves in the interface between the liquids. These waves tend to break up into droplets of the film liquid which disperse in the viscous phase. Second, if the less viscous liquid has even a very slightly greater density than the viscous phase and the conduit is substantially horizontal, the less viscous liquid flows to the bottom of the pipe leaving only a very thin film, if any, at the top and sides. The less viscous liquid then flows in a small stream along the bottom of the pipe while the viscous phase flows in the remainder of the conduit as usual. If the less viscous liquid is lighter than the viscous liquid, the result is the same except the less viscous liquid flows along the top.

An object of my invention is to provide a low viscosity liquid film in a conduit, the film having a decreased tendency to form a rough interface with and disperse into a viscous liquid being transported through the film-lined conduit. Another object is to provide a film in a horizontal conduit which film, in spite of density differences with the viscous liquid being transported, has a decreased tendency to concentrate in the top or bottom of the conduit. Still other objects will be apparent from the following description and claims.

In general, I accomplish the objects of my invention by employing a viscoelastic liquid as the less viscous film. I have found that, if a viscoelastic liquid having a low viscosity but high elasticity is used as the filming liquid, the interface between the film and the viscous liquid is smoother and has less tendency to form waves. In addition, any thin spots in the film, whether at the top, bottom, or elsewhere in the conduit, tend to thicken to establish a film of more uniform thicknesses. There are several rather complex aspects of viscoelasticity. Fortunately, however, the explanation of the action in this case is rather simple. A viscoelastic liquid is one which exhibits some elastic properties as well as viscous properties. When an elastic material is subjected to a shearing strain, the resulting stress in the material can be broken down into one force parallel to the shearing strain and another force perpendicular to this shearing force. This same simple mechanical property is true of viscoelastic liquids.

If a shallow stream of a liquid is allowed to flow along a solid surface, the bottom of the liquid in contact with the solid surface does not move, for all practical purposes. The top of the liquid moves at a maximum velocity. At any level between the top and bottom of the liquid, the velocity is intermediate between velocities at the top and the bottom. Thus, the liquid is being subjected to shear. If the liquid is viscoelastic, the shearing strain causes a resulting stress perpendicular to the solid surface. This stress tends to make the liquid deeper. The greater the shear, the greater the force tending to make the liquid deeper.

This explanation can be applied to the system in which a viscous liquid flows through a conduit surrounded by a viscoelastic liquid film having a low viscosity but a high elasticity. Suppose the viscoelastic liquid has a greater density than the viscous liquid. The viscoelastic liquid will then tend to flow to the bottom of the conduit forming a thick film on the bottom and a thin film on the top. If the bottom film becomes twice as thick as the top film, for example .02 inch on the bottom and .01 inch on the top, then the top film will be sheared approximately twice as strongly as the bottom film. The viscous liquid and, therefore, the inner surface of the film flow at substantially the same velocity at the top and at the bottom of the viscous liquid plug. The films on both the top and bottom have substantially zero velocity where they contact the conduit surface. Thus, both top and bottom films move at some velocity, say 10 feet per second at their inner surface and at zero velocity at their outer surface. In the top film this velocity change takes place over a distance of only .01 inch. In the bottom film, however, the difference takes place over a distance of .02 inch. Thus, in the bottom film the velocity difference per unit of film thickness, the shear, is only half that in the upper film. Since the shear rate is greatest in the thin portion of the film, the stress tending to thicken the film is greatest in the thin portion, thus opposing the effects of gravity difference.

The same explanation applies to the reduction of waves or other thick portions. Any nonuniformity in film thickness is consequently decreased by the elastic properties of the film. The result is a smooth interface between the film and the viscous liquid and a film of more uniform thickness in spite of density differences.

It will be apparent that the smaller the difference in density between the viscous liquid and the film liquid, the less will be the difference in film thickness which will provide sufficient differences in shear to oppose the effects of gravity. It will also be apparent that the higher the elastic property (force perpendicular to the plane of flow), the smaller the difference in film thickness will be. It is desirable, therefore, to use as the film a less viscous liquid having as nearly as possible the same density as the viscous liquid to be transported and having as high a ratio as possible of the perpendicular stress to the shearing stress.

Many laboratory systems have been proposed for determining whether a liquid has elastic properties and, if so, what the magnitude of the force perpendicular to the force of flow might be. Unfortunately, this art is not yet sufficiently well understood to permit more than semi-quantitative measurements. It is difficult, therefore, to define my invention in terms of laboratory measurements. Under these circumstances it has seemed advisable to define viscoelastic liquids in terms of a property which they all seem to exhibit. This is the property of reduced friction in flowing through pipes.

If the film is an aqueous solution, the liquid to which comparison should be made is water itself. A 100-foot section of 2-inch pipe was constructed. This section was preceded and followed by other sections designed to eliminate end effects of the pipe. A differential pressure gage was placed across this 100-foot section of pipe and liquids were pumped through the section at various rates up to about 300 gallons per minute. The pressure drop was measured to determine if the liquid under test gave a pressure drop the same, more, or less than water pumped at the same rate. The results are reported in Table I.

TABLE I

| Test No. | Additive | Concentration, percent | Pressure drop, p.s.i. | Flow rate, g.p.m. |
|---|---|---|---|---|
| 1 | None | | 34.8 | 264 |
| 2 | Magcobar DD | .05 | 34.5 | 259 |
| 3 | Milwhite MD | .05 | 34.9 | 262 |
| 4 | Deytron | .05 | 34.8 | 262 |
| 5 | Con-Det | .05 | 34.9 | 262 |
| 6 | Sodium salt of tall oil acids. | .06 | 33.6 | 257 |
| 7 | Control MD | .05 | 34.8 | 262 |
| 8 | Lubri-film | .02 | 34.7 | 262 |
| 9 | Flax meal [1] | 1.8 | 26.9 | 304 |
| 10 | ----do [1] | 1.8 | 18.7 | 244 |
| 11 | ----do [1] | 3.0 | 25.8 | 295 |
| 12 | ----do [1] | 4.2 | 25.2 | 282 |
| 13 | Guar gum | 0.9 | 21.7 | 280 |
| 14 | ----do | 0.9 | 17.8 | 280 |
| 15 | ----do | 2.0 | 18.3 | 280 |
| 16 | ----do | 2.0 | 14.2 | 240 |
| 17 | ----do | 3.6 | 14.9 | 263 |
| 18 | Synthetic polymer | .03 | 16.5 | 270 |
| 19 | ----do | .03 | 14.9 | 250 |
| 20 | ----do | .06 | 14.5 | 271 |
| 21 | ----do | .11 | 13.0 | 250 |
| 22 | ----do | .09 | 15.5 | 268 |
| 23 | ----do | .09 | 13.5 | 250 |

[1] In sea water.

It will be apparent from the results of the tests that the surface-active agents used in Tests 2 to 8 gave about the same pressure drop as water. It will also be obvious that the flax meal, guar gum, and synthetic polymer gave pressure drops much less than that of water, even though the viscosities of these solutions were somewhat higher than that of water. This phenomenon is not new and is not closely related to the function of my liquid films. The pressure drop reduction simply serves as a convenient means for determining whether a liquid is viscoelastic or not. If an aqueous solution of a polymer provides a friction drop less than that provided by water in the system described in connection with Table I, then it should be regarded as viscoelastic for my purposes. The synthetic polymer is said to be an acrylate-acrylamide copolymer.

If the viscous solution is aqueous, such as molasses for example, then under many conditions the film should preferably be nonaqueous. For these purposes, a hydrocarbon solution such as polyisobutylene in kerosene may be used. It is also possible, particularly in short systems and others described later in more detail, to use a film liquid which is soluble in the transported liquid or vice versa. Thus, an oil solution of polyisobutylene can be used to form a film for transporting a viscous crude oil through a pipe line. It is preferable in some cases, that the transported and filming liquids be substantially insoluble in each other. That is, the solubility of one liquid in the other should not exceed about 1 or 2 percent by weight.

Even the test described above can be a little misleading. There are some properties other than elasticity which can cause reduced pressure drops when the liquids are pumped through pipes. Many liquids having these other properties, however, are also viscoelastic. In addition, the other effects ordinarily are quite small. They rarely, if ever, provide a reduction in pressure in excess of about 20 percent. Therefore, reductions of more than about 20 percent in pressure drop is an almost certain indication of elastic properties.

After the pressure drop test, if there is still some question, laboratory tests such as jet expansion, a tendency to climb up the shaft of a stirring propeller, or development of pressure at the center of a rotating cone or disc near a stationary surface can be used as further confirmation. Such tests are described, for example, in a paper, "Normal Stresses in Fluids: Methods of Measurement, Their Interpretation and Quantitative Results," by J. L. White and A. B. Metzner. The paper was presented at the Second Symposium on Thermophysical Properties, January 24, 1962, and appears in a publication, Progress in International Research on Thermodynamic and Transport Properties, published by the Academic Press.

The function of my process is illustrated by the following example in which a Bunker C fuel oil was pumped through about 827 feet of 2-inch pipe including a U-bend. The oil was quite viscous having a viscosity of about 9,000 centipoises at a temperature of 75° F., which is approximately the temperature at which the oil was pumped. In order to obtain a flow rate of about one gallon per minute, a pressure drop of about 1,000 pounds per square inch was required.

A film of viscoelastic liquid was then used to decrease the pressure required to cause the oil to flow. This viscoelastic liquid was prepared by cooking flax meal (linseed cake) in water and then permitting the hulls to settle out. The flax meal concentration added to the water was about 10 pounds per 42-gallon barrel. Of this amount, about 80 to 85 percent settled to the bottom of the cooking kettle and was discarded. Before the flax meal solution was used, about 30 percent calcium chloride by weight was added to the solution since this would be required during cold weather to prevent freezing of the solution. The pH of the solution was adjusted to about 8.5 and sodium chromate was added as a corrosion inhibitor. A slug of this viscoelastic liquid was first pumped through the pipe to establish a good film on the inside pipe wall. Then the solution was injected as a film into the pipe at the same time the viscous oil was pumped. A piston pump injected the film in intermittent pulses. Continuous injection is preferred. The ratio of film to oil volume was about 1:50. The pressure drop required to maintain a flow of one gallon per minute with the viscoelastic film was between 20 and 30 pounds per square inch.

Many water soluble polymers form aqueous solutions which are viscoelastic. Sodium carboxymethyl cellulose was one of the first polymers in which the property was recognized, although it is not one of the more effective polymers. Many others are known in the art, particularly in hydraulic fracturing of oil wells where the materials are used to decrease pressures required to inject liquid at high rates down wells. It should be pointed out that in hydraulic fracturing operations, the liquids are not used as films, but as the only liquid being pumped. Guar gum is recognized as one of the better agents for this purpose, although several synthetic polymers have also recently become available. For example, at least some of the acrylamide-acrylate copolymers provide high normal stresses at low concentrations. The natural gums have the advantage of low cost, but the disadvantage of variable composition.

Flaxseed meal, sometimes called flax meal or linseed cake, is particularly desirable because of unusually low cost and also because it retains most of its ability to form viscoelastic aqueous solutions even when the water contains considerable salt. This is shown in Table I where the flax meal was dispersed in seawater. This makes possible use of sufficient salt to avoid freezing. The salt water is usually corrosive so an inhibitor such as a chromate should be included. A preservative such as paraformaldehyde, sodium pentachlorophenate, or the like should also be included in the natural gum solutions. The synthetic polymers are generally more resistant to bacterial attack.

The thickness of the film which should be used depends to some extent on the diameter of the conduit through which the liquids are flowing. A film thickness of a few hundredths of an inch is adequate in small pipes up to 10 or 12 inches in diameter. Thicker films should be used in larger pipes. A general correlation seems to exist between the percent reduction in pressure drop and the ratio of the volumes of the film and principal transporting liquid. Thus, rather than determining the amount of film-forming liquid on the basis of film thickness to be formed, it is generally best to use a volume of film-forming liquid equal to a certain percentage of the volume of the transported liquid. A volume of film-forming liquid equal to about 1 or 2 percent of the volume of the transported liquid has worked well in tests. In general, the larger the amount of film, the greater the pressure drop reduction. Thus, if economic considerations permit, the filming liquid may be as much as 10 or even 20 percent of the volume of the transported liquid. In other cases, economics may indicate the use of less than 1 percent as much of the viscoelastic film-forming liquid as of the transported liquid.

If only temporary effects are required, the film can be formed as by pumping a slug of viscoelastic liquid through the conduit and following it by the fluid to be transported. For more permanent effects, the film must be maintained by continuous or intermittent injection of the viscoelastic liquid at the inner surface of the conduit.

Use of the viscoelastic liquid film greatly reduces the number of pumps required to induce flow of a given volume of viscous liquid through a given length of pipe line. Nevertheless, in a long pipe line several pumping stations may be required. Before the liquid and surrounding film enter a pump where the two liquids would be mixed together, it is advisable to remove the film-forming liquid, separate it from any accompanying viscous liquid, and reinject the film-forming liquid downstream from the pump. Apparatus for accomplishing this is described in U.S. Patent 2,821,205, for example. In some cases it may be more economical to omit the separation of the filming liquid before the pump and simply use new viscoelastic liquid downstream from the pump.

While use of films of viscoelastic liquids in the transportation of viscous liquids has been described principally in connection with pipe lines, it will be apparent that there are other applications of films of viscoelastic liquids. For example, some benefit can be obtained by use of viscoelastic liquid films in troughs or in horizontal pipes running only partly full. In these cases the viscoelastic liquid tends to flow up the sides of the pipe or trough and decreases the frictional drag of any viscous liquid being transported. Viscoelastic liquid films are particularly advantageous in conduits of noncircular cross-section. In such conduits viscoelastic liquids have an even greater tendency than in circular cross-section pipes to form films of more uniform thickness than those formed by liquids which are not viscoelastic.

Still another application of viscoelastic liquids can be made to wells. For example, if a well is flowing a viscous oil, a solution of flax meal, guar gum or the like can be injected into the annular space between the tubing and casing. The aqueous solution settles through any oil in the annular space and enters the tubing to form a film which increases flow of oil from the well. The same technique can also be used to advantage in wells troubled with paraffin or scale whether the oil is viscous or not. In this case the viscoelastic film prevents contact of well fluid with the internal tubing wall and thus prevents deposition of the paraffin or scale. It will be apparent, then, that the viscoelastic films can be used in wells, pipe lines, or the like for purposes such as preventing paraffin and scale deposition which do not necessarily involve viscous liquids.

If the viscoelastic liquid is to be used in a well, it will be apparent that the liquid may be introduced down a separate tubing string if desired. This facilitates the use of special injection rings and the like which form better films of the material. This may be particularly advisable if the well is a pumping well, in which case the viscoelastic liquid can be injected into the tubing above the level of the pump. When used with vertically flowing liquids, it is more important to have rather closely matched densities of transported and filming liquids to prevent excessive vertical separation in case flow is interrupted.

The invention can even be applied in some cases to systems involving gas. For example, in so-called condensate wells, water condenses from the expanded, and therefore cooled, gases near the top of the well. The condensed water collects on the internal tubing surface and causes corrosion. It will be apparent that a viscoelastic liquid can be injected to form a film on the interior surface of the tubing at a point below the level at which water condenses. The high rate of flow of gas up the well sweeps the film up the well, protecting the surface of the tubing from the condensing water. The viscoelastic liquid in this case can be either a water or oil solution. Preferably the solution should contain a corrosion inhibitor. The general function of the viscoelastic film in this and the other examples is to inhibit contact of the flowing fluid with the surface of the conduit through which the flow is occurring.

My invention will be better understood from the following example. A pipeline in Wyoming was 4 inches in diameter and a little over 5 miles long. The pipeline carried a very viscous oil with a pour point of about 70° F. There was little difficulty pumping this crude oil for about 7 months of the year. During the coldest 5 months, however, considerable dilution with liquid condensate from gas wells in the area was necessary to keep the injection pressure below a safe upper limit.

An injector was installed on this line to introduce a film of viscoelastic liquid into the line. Various amounts of several films were used. The results are shown in Table II.

TABLE II

| Test No. | Viscoelastic liquid | Vol. ratio, film to oil | Pressure drop, p.s.i. | Temperature, °F. | |
|---|---|---|---|---|---|
| | | | | Inlet | Outlet |
| 1 | None | | 1,000 | 77 | 38 |
| 2 | 10 lb./bbl. flax-meal in water. | 1:100 | 758 | 83 | 36 |
| 3 | 1% polybutene in oil. | 1:250 | 909 | 74.5 | 37 |
| 4 | do | 1:100 | 638 | 76 | 39 |
| 5 | do | 1:50 | 416 | 75 | 31 |
| 6 | Polybutene solvent only. | 1:50 | 683 | 68.5 | 39 |

The solvent used for the polybutene was condensate from gas wells. The temperature at the inlet end of the line was higher than that at the outlet end because the oil had to be heated above its pour point in order to pump it. The oil cooled rapidly in the buried line. The flow rate of oil in all cases was about 16 barrels per hour.

At least three significant observations were made in connection with the field tests. First, it is obvious from a comparison of Test 2 to Test 1, that the viscoelastic water film greatly reduced the pressure required to pump 16 barrels per hour of oil through the line. Second, Tests 3 to 5 show that viscoelastic oil film was more effective in reducing the pressure drop. Third, Test 6 shows that in this particular system the solvent alone was able to provide a considerable decrease in the pressure required to cause the desired rate of flow.

These observations, together with further study in the laboratory, showed that two factors are more important than previously realized. One is the viscosity and the gelling tendency of the oil. The other is the nature of the film injector.

If the oil or other transported liquid has a low viscosity and has little tendency to gel, the distance which even a viscoelastic film will travel before becoming dissipated may be only a few hundred feet. The distance is, of course, greater than if the film is not viscoelastic. The greater the viscoelasticity of the film, the greater distance it will travel before being lost. The distance is sufficiently short however, so that cost considerations tend to limit use of viscoelastic films to rather shallow wells, short flow lines or the like if the transported liquid is not very viscous. As the viscosity of the transported liquid increases, however, the distance to which the film will persist also increases. When the transported liquid is so viscous or gellatinous that its pour point is above the transportation temperature, the distance to which a good viscoelastic film will remain stable becomes very great. Even a non-viscoelastic film may persist to a considerable distance in such cases as shown by Test 6 in Table II. A comparison of Tests 5 and 6, however, shows the benefit of making the film viscoelastic even in such cases. When reference is made to the pour point of an oil, this is to be determined by the method set forth in ASTM Tests D97-57.

If the oil, or other transported liquid, is at a temperature below its pour point and a strongly viscoelastic liquid is used as the film, the method of injecting the film may not be particularly important. For less viscous oil, or for less viscoelastic films, however, the method of forming the film becomes very important. In all cases, it is best to inject the film at as nearly as possible the velocity and thickness at which the film will travel along the conduit. In the field test, an apparatus was used which made possible close control of the velocity and thickness of the injected film. This apparatus is also responsible in part for the good results shown in Table II, particularly in Test 6.

A comparison of Tests 3, 4, and 5, in Table II, shows the effects of variations in the ratio of film to transported liquid volumes. Obviously, the thicker the films, the less the friction. While no tests were made with different polymer concentrations, the results in Test 6 show that in some cases no polymer may be required. In some cases a very low concentration of polymer may be used to obtain a small decrease in friction. This may be advisable, for example, where a pipeline injection pressure in cold weather is very close to the safe maximum operating pressure of the line. In such cases, a concentration of only 0.1% or even less of the polymer used in the tests of Table II may be all that is required.

The field test together with additional laboratory work showed that the advantage of using a film insoluble in the transported liquid was not as great as had been previously thought. In the case of oil being transported at a temperature below its pour point, the advantages are actually in favor of using an oil film. There is no danger of emulsion formation, there are less corrosion problems, and most important, some solutions of organic polymers in oil are much more highly viscoelastic than any known water solutions. A comparison of Tests 2 and 4 in Table II illustrates the superiority of the polybutene in oil over the flax meal in water, for example.

The polybutene used in the tests reported in Table II was not the best available for forming viscoelastic films. This polymer had a molecular weight of only a few thousand. Polyisobutylene with molecular weights in the range of several hundred thousand are available. Laboratory tests have shown that as little as one pound of such polymers in 100 barrels of kerosene (42 U.S. gallons per barrel) will form very satisfactory viscoelastic liquids. Even lower concentrations can be used in some cases.

Other polymers such as polypropylene, styrene-ethylene copolymers, polymethacrylates, such as polycetyl methacrylates and unvulcanized butyl rubber have been reported to impart viscoelasticity to oil. Still others are known and are used in the hydraulic fracturing art to reduce the friction of oil-base fracturing liquid. As in the case of water-soluble gums, these additives are introduced into the fracturing liquid itself, in fracturing operations, no films being used. Non-viscous oils containing these additives can be used, however, as viscoelastic films for transporting viscous oils.

When a viscous liquid, such as a viscous crude petroleum oil, is to be transported, it may sometimes be advisable to change the properties of the transported liquid itself, and still use a viscoelastic film. In one field test, for example, the temperatures become very low so that using a rather thin viscoelastic film did not keep pressures quite as low as desired. In this case, an occasional small volume of crude oil diluted with 20 percent gas well condensate was injected. The combination of dilution and viscoelastic film was sufficient to keep the pressure well below the maximum operating pressure of the line.

In other cases it may actually be advisable to increase the viscosity or gelling tendencies of the transported oil. As previously noted, if the pour point of the oil is above the temperature at which the liquid flows through the line, the viscoelastic film persists almost indefinitely. Thus, suppose the pour point of a viscous crude oil is only a few degrees below the line temperature. In this case it may be advantageous to add a small amount of a gelling agent such as an aluminum salt of a high molecular weight fatty acid to raise the pour point of the oil since this improves the distance over which the viscoelastic film will persist. Suitable agents for gelling oils are described in references such as U.S. Patents 2,492,173, Mysels; 3,097,168, Gibson; and 3,113,849, McCoy. Agents for gelling water include gums, starches, water-soluble polymers and the like. Again, the hydraulic fracturing art serves as a course of many agents for gelling oil or water or for increasing the viscosity of these liquids.

If a viscoelastic oil film is used, the viscosity of the film should be as low as possible. In very cold weather gasoline is ordinarily preferred since the viscosity is very low. At low temperatures, the dangers of the volatility and flammability of this material are decreased. Kerosene may be preferred in many cases to decrease fire hazards. The less viscous of the fuel oils may also be used in some cases for reasons such as their convenient availability. Usually, however, gasoline or kerosene are readily available and are preferred because of their low viscosities.

The applications of my invention given above are by way of example only and not by way of limitation. Still further applications of my invention will occur to those skilled in the art. I do not wish, therefore, to be limited by the examples which have been presented, but only by the following claims.

I claim:
1. A method for transporting viscous oil, and viscous water and oil solutions and suspensions through a pipe comprising causing the viscous liquid to flow through said pipe while introducing a liquid, as a film, at the internal surface of said pipe, the viscosity of said introduced liquid being less than the viscosity of said viscous liquid, said introduced liquid, when sheared under conditions of use, developing a force perpendicular to the direction of shear, said introduced liquid being an aqueous solution of a polymer selected from the group consisting of sodium carboxymethyl cellulose, guar gum, and flax meal.

2. The method of claim 1 in which said introduced liquid is introduced substantially continuously.

3. The method of claim 1 in which said introduced liquid, when flowing through a given conduit at a given rate substantially the same as the rate under conditions of use, produces a pressure drop at least 20 percent less than the pressure drop produced by the solvent alone flowing through the same conduit at the same rate.

References Cited

UNITED STATES PATENTS

| | | | |
|---|---|---|---|
| 2,492,173 | 12/1949 | Mysels | 137—13 |
| 2,533,878 | 12/1950 | Clark et al. | 137—13 |
| 2,818,079 | 12/1957 | Garrison | 137—1 |
| 3,096,777 | 7/1963 | Parks et al. | 252—8.3 X |
| 3,102,548 | 9/1963 | Smith et al. | 137—13 |
| 3,209,771 | 10/1965 | Gogarty et al. | 137—1 |
| 3,215,154 | 11/1965 | White et al. | 252—8.55 X |
| 3,216,435 | 11/1965 | Poettmann | 137—13 |
| 3,244,188 | 4/1966 | Parks et al. | 252—8.3 X |

HERBERT B. GUYNN, *Primary Examiner.*

U.S. Cl. X.R.

166—41; 252—8.3, 8.55